(12) United States Patent
Cardon et al.

(10) Patent No.: US 8,541,912 B2
(45) Date of Patent: Sep. 24, 2013

(54) PLANAR MOTOR FOR POSITIONING A LOAD ALONG A PLANE

(75) Inventors: Vincent Cardon, Arcenant (FR); Jean-Pierre Morel, Les Fourgs (FR)

(73) Assignee: ETEL S.A., Motiers (CH)

( * ) Notice: Subject to any disclaimer, the term of this patent is extended or adjusted under 35 U.S.C. 154(b) by 1145 days.

(21) Appl. No.: 12/120,451

(22) Filed: May 14, 2008

(65) Prior Publication Data

US 2008/0290741 A1  Nov. 27, 2008

(30) Foreign Application Priority Data

May 25, 2007  (DE) .......................... 10 2007 024 602

(51) Int. Cl.
*H02K 41/02* (2006.01)
(52) U.S. Cl.
USPC ..................................... 310/12.05; 310/12.06
(58) Field of Classification Search
USPC ........................... 310/12, 13, 14, 12.05, 12.06
IPC ....................................................... H02K 41/02
See application file for complete search history.

(56) References Cited

U.S. PATENT DOCUMENTS

| | | | | |
|---|---|---|---|---|
| 5,723,917 | A * | 3/1998 | Chitayat | 310/12 |
| 6,188,147 | B1 * | 2/2001 | Hazelton et al. | 310/12 |
| 6,879,063 | B2 | 4/2005 | Frissen et al. | |
| 7,145,271 | B2 * | 12/2006 | Thirunarayan et al. | 310/12 |
| 7,170,203 | B2 * | 1/2007 | Cheung et al. | 310/12 |
| 2003/0155821 | A1 | 8/2003 | Frissen et al. | |
| 2005/0077786 | A1 * | 4/2005 | De Weerdt | 310/12 |
| 2005/0200830 | A1 * | 9/2005 | Carter et al. | 310/12 |
| 2006/0049699 | A1 * | 3/2006 | Wang et al. | 310/12 |

FOREIGN PATENT DOCUMENTS

| | | |
|---|---|---|
| JP | 09-092498 | 4/1997 |
| JP | 2007-028734 | 2/2007 |

OTHER PUBLICATIONS

European Search Report, issued in corresponding European Patent Application No. 08001773.4.

* cited by examiner

*Primary Examiner* — Tran Nguyen
*Assistant Examiner* — Michael Andrews
(74) *Attorney, Agent, or Firm* — Kenyon & Kenyon LLP

(57) ABSTRACT

A planar motor includes a flat base element arranged in a plane, and substantially cuboidal first magnets arranged on the base element whose magnetization is perpendicular to the plane and which are arranged at evenly spaced intervals and with alternating polarity in a first direction and in a second direction. The planar motor also includes substantially cuboidal second magnets whose magnetization is parallel to the plane and which are disposed with alternating polarity in the first direction and second direction between the first magnets, so that each first magnet is surrounded by four second magnets. The first magnets are disposed on protrusions of the base element.

14 Claims, 1 Drawing Sheet

PLANAR MOTOR FOR POSITIONING A LOAD ALONG A PLANE

CROSS-REFERENCE TO RELATED APPLICATIONS

The present application claims priority to Application No. 10 2007 024 602.3, filed in the Federal Republic of Germany on May 25, 2007, which is expressly incorporated herein in its entirety by reference thereto.

FIELD OF THE INVENTION

The present invention relates to a planar motor. Such planar motors are used, e.g., for positioning a load in a plane.

BACKGROUND INFORMATION

For example, planar motors are familiar from the electronics industry where, when manufacturing integrated circuits, semiconductor wafers must be positioned with extreme accuracy in a plane, for example, in order to process the wafers photolithographically.

U.S. Pat. No. 6,188,147 describes such a planar motor, which features a planar base element having pyramid-shaped protrusions on which magnets having different directions of magnetization are mounted, so that in sum, a magnetic field perpendicular to the base element is obtained over each of the pyramids. Between the pyramids, further magnets having a magnetization parallel to the base element are arranged according to the type of a Halbach array. Such a magnet array is quite costly to produce, since a great number of magnets with very narrow dimensional tolerances are necessary, whose placement is difficult because of the strong magnetic forces.

U.S. Pat. No. 6,879,063 describes a planar motor having a simpler design with a Halbach array of magnets. In that case, the magnets are cuboidal, i.e., have the shape of a right parallelepiped, which reduces their number in comparison to the device above. Nevertheless, these magnets must also be produced with narrow tolerances, and it is necessary to cope with high magnetic forces during the installation.

SUMMARY

Example embodiments of the present invention provide a planar motor which is easier to produce, particularly as far as the demands on the dimensional tolerances of the magnets and the mounting of the magnets on the base plate are concerned.

According to example embodiments of the present invention, a planar motor includes a flat base element lying in one plane, and substantially cuboidal first magnets, i.e., first magnets arranged as rectangular parallelepipeds, disposed on it whose magnetization is perpendicular to the plane and which are arranged at evenly spaced intervals and with alternating polarity in a first direction and in a second direction. In addition, the planar motor has substantially cuboidal second magnets, i.e., second magnets arranged as rectangular parallelepipeds, whose magnetization is parallel to the plane and which are disposed with alternating polarity in the first direction and second direction between the first magnets, so that each first magnet is surrounded by four second magnets. The planar motor is characterized in that the first magnets are disposed on protrusions of the base element.

The protrusions facilitate the placement of the magnets and form grooves for receiving the second magnets. If second magnets have been placed during the assembly of the planar motor, they are retained by the additional support which the grooves offer to the second magnets, and can no longer easily slip out of place during the hardening of an adhesive, for example. Furthermore, the magnets are not adapted to each other, but rather to the protrusions and grooves, so that magnets having greater manufacturing tolerances with respect to their size may be used.

According to an example embodiment of the present invention, a planar motor includes: a flat base element arranged in a plane; substantially cuboidal first magnets arranged on the base element, magnetization of the first magnets perpendicular to the plane, the first magnets arranged at evenly spaced intervals and with alternating polarity in a first direction and in a second direction; and substantially cuboidal second magnets, magnetization of the second magnets parallel to the plane, the second magnets arranged with alternating polarity in the first direction and the second direction between the first magnets, each first magnet surrounded by four second magnets. The first magnets are arranged on protrusions of the base element.

Perpendicular to the plane, a sum of a height of the first magnets and a height of the protrusions may correspond to a height of the second magnets so that surfaces of the first magnets and the second magnets facing away from the base element are located in a common plane parallel to the base element.

Perpendicular projections of the protrusions and of the first magnets into the plane may be congruent.

The second magnets may be arranged in grooves formed by two adjacent protrusions.

A width of the groove may correspond to a width of the second magnets so that the second magnets are supported laterally by the protrusions.

The base element may be formed of a steel plate.

The base element may be formed of at least one of (a) aluminum, (b) a composite material, (c) an epoxide, and (d) polyoxymethylene.

The first magnets may be cemented to the base element.

The second magnets may be cemented to the base element.

The grooves may be at least one of (a) trapezoidal and (b) dovetailed.

The four second magnets surrounding each first magnet may have a same magnetization direction with respect to the first magnet.

The first magnets and the second magnets may be arranged in a two-dimensional Halbach array.

The planar motor may include a movable part arranged on a side of the first magnets and the second magnets opposite to the base element, and the movable part may include at least one coil.

The coil may be arranged as an elongated coil.

The protrusions may be formed by at least one of (a) machining, (b) stamping, (c) casting, (d) sintering, and (e) electrodeposition.

Further features and aspects of example embodiments of the present invention are described in further detail below with reference to the appended Figures.

DETAILED DESCRIPTION

Figure 1:
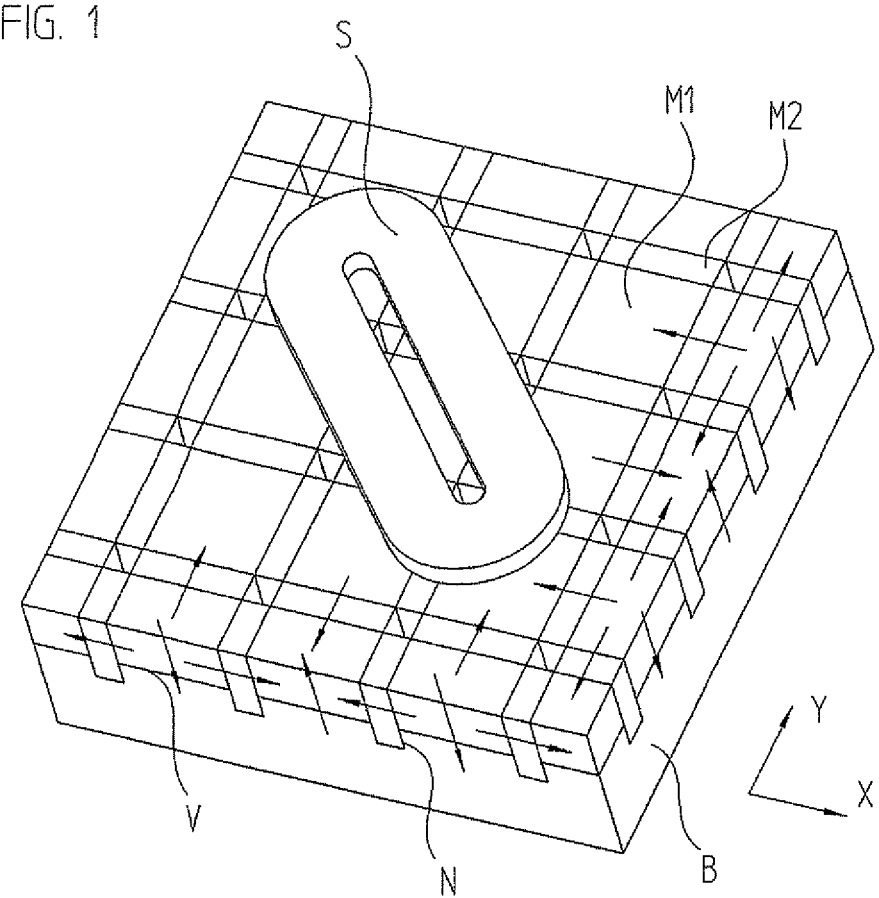
FIG. 1 is a schematic perspective view of a planar motor according to an example embodiment of the present invention.
Figure 2:
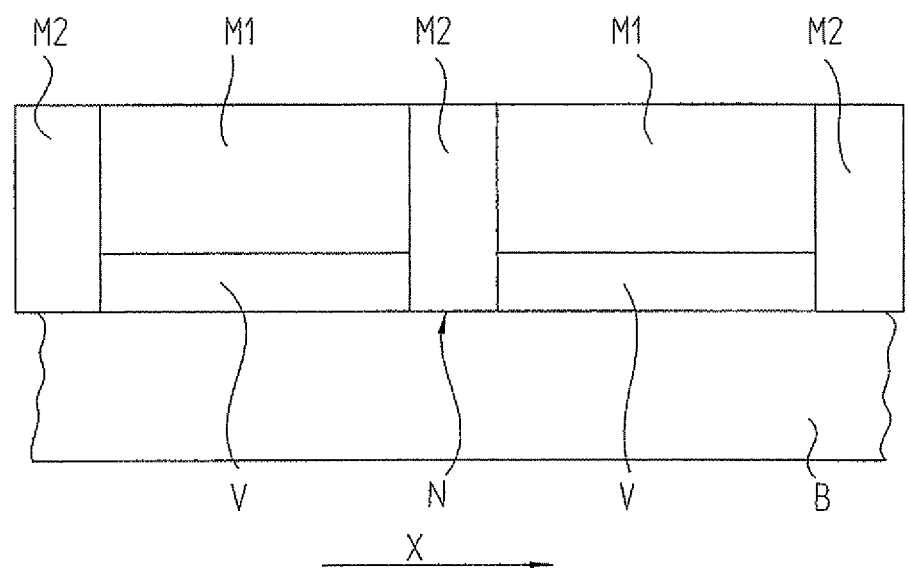
FIG. 2 is a schematic cross-sectional view through the planar motor.

FIG. 1 is a schematic perspective view of a planar motor according to an example embodiment of the present invention, and FIG. 2 is a schematic cross-sectional view of the planar motor with direction of view in the Y-direction. Reference is made to both figures in the following description.

The planar motor has a stator in which, disposed on a base element B in plane XY are substantially cuboidal first magnets M1 whose magnetization is perpendicular to plane XY and which are disposed at evenly spaced intervals and with alternating polarity in a first direction X and in a second direction Y. In addition, the planar motor has substantially cuboidal second magnets M2 whose magnetization is parallel to plane XY in the X direction or Y direction, and which in each case are disposed with alternating polarity in first direction X and second direction Y between first magnets M1. The magnetization directions of magnets M1, M2 are indicated with arrows in the area of the visible cutting edges of FIG. 1.

A movable part having the load to be positioned is located above magnets M1, M2. This movable part includes elongated coils S (of which only one is illustrated in FIG. 1), which are aligned at an angle with respect to the X direction and Y direction. By suitable energizing of these coils S, it is possible to position the movable part of the planar motor very accurately in the X direction and Y direction.

The substantially cuboidal first and second magnets M1, M2 may have rounded or beveled edges. Straight prisms, whose shape and magnetic effect do not differ significantly from the shape and effect of rectangular parallelepipeds, should also be considered to be substantially cuboidal, especially if they have two surfaces parallel to base element B, as well as surfaces perpendicular to base element B as contact surfaces one with another.

Each first magnet M1 is surrounded by four second magnets M2. The four second magnets M2 surrounding a specific first magnet M1 all have the same direction of magnetization with respect to this first magnet M1, e.g., either toward first magnet M1 or away from this magnet M1. Such a magnet array is also referred to as a two-dimensional Halbach array.

First magnets M1 are mounted on protrusions V on base element B.

Perpendicular to plane XY, the difference between a height of second magnets M2 and the height of protrusions V corresponds precisely to the height of the first magnets. Since protrusions V and second magnets M2 are mounted on planar base element B, the surfaces of first and second magnets M1, M2 facing away from base element B are arranged in a common plane above base element B.

Protrusions V and first magnets M1 are congruent with respect to a perpendicular projection into plane XY. For example, protrusions V and magnets M1 are quadratic in this projection.

Protrusions V form grooves N in which second magnets M2 are arranged. The width of grooves N corresponds to the width of second magnets M2 in this direction. Second magnets M2 are therefore laterally supported by protrusions V. Grooves N may also be trapezoidal or dovetailed. Thus, when mounting magnets M1, M2, second magnets M2 may first be cemented in place in grooves N. In so doing, the position of the second magnets is defined by protrusions V and grooves N. During the mounting of first magnets M1, second magnets M2 can no longer slip easily out of place, which simplifies the mounting process considerably. Similar to second magnets M2, first magnets M1 are cemented to base element B.

Since first magnets M1 and second magnets M2 are not adapted to each other, but rather to protrusions V and grooves N, the dimensional tolerances of magnets M1, M2 may be greater.

In addition, due to protrusions V, it is possible to use thinner first magnets M1 than as may be provided in certain conventional arrangements, which makes the planar motor more favorable to produce. Given a height of protrusion V of 5 mm, for example, and a height of the magnet of 30 mm, a reduction in the magnet height from 35 mm to 30 mm results, thus a volume reduction of the first magnets by approximately 14%. The performance of the planar motor is not noticeably reduced by this, particularly if a magnetically conductive material is used for base element B and its protrusions V.

Protrusions V may be produced by removing material from base element B by machining. However, separate protrusions V may also be secured to base element B. All customary attachment techniques are possible for this purpose. Base element B and protrusions V may be produced in one piece by stamping, casting, sintering, etc. Protrusions V may also be produced by electrodeposition.

Base element B may be made of a steel plate, e.g., 40 mm thick, into which grooves N of 5 mm depth are cut. Protrusions V thereby formed then have the height of 5 mm mentioned.

In order to save on costs and/or weight, base plate B and/or protrusions V may also be produced from other materials. For example, aluminum or other light metals, or perhaps composites having epoxide or polyoxymethylene (POM; Delrin) are possibilities for this purpose.

What is claimed is:

1. A planar motor, comprising:
a flat base element arranged in a plane;
substantially cuboidal first magnets arranged on the base element, magnetization of the first magnets perpendicular to the plane, the first magnets arranged at evenly spaced intervals and with alternating polarity in a first direction and in a second direction;
substantially cuboidal second magnets, magnetization of the second magnets parallel to the plane, the second magnets arranged with alternating polarity in the first direction and the second direction between the first magnets, each first magnet surrounded by four second magnets;
wherein the first magnets are arranged on protrusions of the base element;
wherein the second magnets are arranged in grooves formed by two adjacent protrusions; and
wherein a width of the groove corresponds to a width of the second magnets over a full depth of the groove so that the second magnets are supported laterally by the potrusions.

2. The planar motor according to claim 1, wherein, perpendicular to the plane, a sum of a height of the first magnets and a height of the protrusions corresponds to a height of the second magnets so that surfaces of the first magnets and the second magnets facing away from the base element are located in a common plane parallel to the base element.

3. The planar motor according to claim 1, wherein perpendicular projections of the protrusions and of the first magnets into the plane are congruent.

4. The planar motor according to claim 1, wherein the base element is formed of a steel plate.

5. The planar motor according to claim 1, wherein the base element is formed of at least one of (a) aluminum, (b) a composite material, (c) an epoxide, and (d) polyoxymethylene.

6. The planar motor according to claim 1, wherein the first magnets are cemented to the base element.

7. The planar motor according to claim 1, wherein the second magnets are cemented to the base element.

8. The planar motor according to claim 4, wherein the grooves are at least one of (a) trapezoidal and (b) dovetailed.

9. The planar motor according to claim 1, wherein the four second magnets surrounding each first magnet have a same magnetization direction with respect to the first magnet.

10. The planar motor according to claim 1, wherein the first magnets and the second magnets are arranged in a two-dimensional Halbach array.

11. The planar motor according to claim 1, further comprising a movable part arranged on a side of the first magnets and the second magnets opposite to the base element, the movable part including at least one coil.

12. The planar motor according to claim 11, wherein the coil is arranged as an elongated coil.

13. The planar motor according to claim 1, wherein the protrusions are formed by at least one of (a) machining, (b) stamping, (c) casting, (d) sintering, and (e) electrodeposition.

14. A planar motor, comprising:

flat base means arranged in a plane;

substantially cuboidal first magnet means arranged on the base means, magnetization of the first magnet means perpendicular to the plane, the first magnet means arranged at evenly spaced intervals and with alternating polarity in a first direction and in a second direction;

substantially cuboidal second magnet means, magnetization of the second magnet means parallel to the plane, the second magnet means arranged with alternating polarity in the first direction and the second direction between the first magnet means, each first magnet means surrounded by four second magnet means;

wherein the first magnet means are arranged on protrusion means of the base means;

wherein the second magnet means are arranged in grooves formed by two adjacent protrusions means; and wherein a width of the groove corresponds to a width of the second magnet means over full depth of the groove so that the second magnet means are supported literally by the protrusions.

* * * * *